Patented Aug. 8, 1933

1,921,722

UNITED STATES PATENT OFFICE 1,921,722

SOLVENT FOR REMEDIES

Rudolf Berendes and Walter Kropp, Elberfeld, Germany, assignors to Winthrop Chemical Company, Inc., New York, N. Y., a Corporation of New York No Drawing. Application May 17, 1929, Serial No. 363,992, and in Germany August 13, 1928

11 Claims. (Cl. 167—52)

The present invention relates to new compositions of matter comprising barbituric acid derivatives.

We have found that aqueous solutions of barbituric acid derivatives which are difficultly soluble in water, such as phenylethylbarbituric acid, diethylbarbituric acid and diallylbarbituric acid, can be prepared by dissolving these products in an aqueous solution of a monoalkylamide of a lower member of the fatty acid series. The monoalkylamides used for the purpose of our invention are easily soluble in water and do not exert any poisonous action even in high concentrations. They are therefore valuable in the manufacture of solutions for subcutaneous injections.

The concentration of the monoalkylamides of the fatty acids may be varied within wide limits, but somewhat depends on the specific remedy and monoalkylamide.

The invention is illustrated by the following examples, but is not restricted thereto:

*Example 1.*—20 grams of phenylethylbarbituric acid are dissolved in 100 ccm of a 75% aqueous monomethylacetamide solution.

*Example 2.*—15 grams of cyclohexenylethylbarbituric acid are dissolved in 100 ccm of a 75% aqueous monoethylacetamide solution.

*Example 3.*—20 grams of cyclohexenylethylbarbituric acid are dissolved in 100 ccm of an 80% aqueous monomethylacetamide solution.

We claim:

1. As a new composition of matter a homogeneous liquid mixture comprising a barbituric acid hypnotic compound, difficultly soluble in water, a watersoluble monoalkylamide of a lower fatty acid and water, said composition being suitable for injection purposes in medicinal use and being non-toxic even when employing the said monoalkylamide in a high concentration.

2. As a new composition of matter a homogeneous liquid mixture comprising a barbituric acid hypnotic compound, difficultly soluble in water, a watersoluble monomethylamide of a lower fatty acid and water, said composition being suitable for injection purposes in medicinal use and being non-toxic even when employing the said monomethylamide in a high concentration.

3. As a new composition of matter a homogeneous liquid mixture comprising a barbituric acid hypnotic compound, difficultly soluble in water, monomethylacetamide and water, said composition being suitable for injection purposes in medicinal use and being non-toxic even when employing said monomethylacetamide in high concentration.

4. As a new composition of matter a homogeneous liquid mixture comprising phenylethylbarbituric acid, a watersoluble monoalkylamide of a lower fatty acid and water, said composition being suitable for injection purposes in medicinal use and being non-toxic even when employing the said monoalkylamide in a high concentration.

5. As a new composition of matter a homogeneous liquid mixture comprising phenylethylbarbituric acid, a watersoluble monomethylamide of a lower fatty acid and water, said composition being suitable for injection purposes in medicinal use and being non-toxic even when employing the said monoalkylamide in a high concentration.

6. As a new composition of matter a homogeneous liquid mixture comprising phenylethylbarbituric acid, monomethylacetamide and water, said composition being suitable for injection purposes in medicinal use and being non-toxic even when employing said monomethylacetamide in high concentration.

7. As a new composition of matter a homogeneous liquid mixture containing 20 grams of phenylethylbarbituric acid for each 100 c.c. of a 75% aqueous monomethylactamide solution, said composition being suitable for injection purposes in medicinal use and being non-toxic.

8. As a new composition of matter a homogeneous liquid mixture comprising cyclohexenylethylbarbituric acid, a water-soluble monoalkylamide of a lower fatty acid and water, said composition being suitable for injection purposes in medicinal use and being non-toxic even when employing said monoalkylamide in a high concentration.

9. As a new composition of matter a homogeneous liquid mixture comprising cyclohexenylethylbarbituric acid, a water-soluble monomethylamide of a lower fatty acid and water, said composition being suitable for injection purposes in medicinal use and being non-toxic even when employing said monomethylamide in a high concentration.

10. As a new composition of matter a homogeneous liquid mixture comprising cyclohexenylethylbarbituric acid, monomethylacetamide and water, said composition being suitable for injection purposes in medicinal use and being non-toxic even when employing said monomethylacetamide in a high concentration.

11. As a new composition of matter a homogeneous liquid mixture containing 20 grams of cyclohexenylethylbarbituric acid for each 100 ccs. of an 80% aqueous monomethylacetamide solution, said composition being suitable for injection purposes in medicinal use and being non-toxic.

RUDOLF BERENDES. [L. s.]
WALTER KROPP. [L. s.]